June 17, 1952    E. J. GRACE, JR    2,600,528
APPARATUS FOR ELEVATING CONTACT MATERIAL
Filed Sept. 22, 1950

INVENTOR.
EDWARD J. GRACE, JR.
BY
*Busser and Harding*
ATTORNEYS

Patented June 17, 1952

2,600,528

UNITED STATES PATENT OFFICE 2,600,528

APPARATUS FOR ELEVATING CONTACT MATERIAL

Edward J. Grace, Jr., Swarthmore, Pa., assignor to Sun Oil Company, Philadelphia, Pa., a corporation of New Jersey Application September 22, 1950, Serial No. 186,141

5 Claims. (Cl. 302—53)

This invention relates to a system and apparatus for moving granular or pelleted contact material or catalyst from a lower receptacle which receives the material in a continuous stream upwardly into and through an elongate conduit to an upper receptacle. In particular the invention is directed to apparatus for introducing material in the lower receptacle into a fluid stream in order to convey the material through the elongate conduit in such a manner as to reduce attrition of the material particles or pellets to a minimum during passage to the upper receptacle.

It is well known in the art of catalytic operations, such as the cracking of heavier petroleum fractions to gasoline and other hydrocarbon processing operations to use a catalytic or contact material in a continuous system. In such continuous systems a conversion zone is operated continuously while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regenerating zone to the upper conversion zone two well known means applicable to the transportation of granular solids from one locus to another have been used, namely: by mechanical conveyors and by pneumatic conveyors, in the latter of which air, steam or flue gas produced at the refinery is readily available as the pneumatic lifting medium.

It is necessary in systems employing conversion and regeneration zones in superposed relationship to convey the catalyst or contact material which is usually in pelleted or granular form through a conduit several hundred feet in length in order to return it from the lower reaction zone to the upper reaction zone. From the lower reaction zone the material is delivered to a receptacle positioned at a lower level from which the material is lifted through said conduit to the upper reaction zone. This lowermost receptacle is generally known in the art as an engager since the material is engaged therein by the lifting medium to effect the lifting operation. The lower end or inlet end of the lift conduit extends into or is in communication with the engager receptacle while the upper end or outlet end of the lift conduit communicates with an upper receptacle positioned at a level above the top of the upper reaction zone or chamber. The upper receptacle is designed so that the lifting medium is separated from the catalyst or contact material and is generally known as the disengager.

The present invention is directed to the engager portion of the continuous catalyst system. According to the invention a stream of lifting fluid impinges upon material below the lift conduit and conveys such material into the lift conduit while another stream of lifting fluid lifts the material, so conveyed, upward through the lift conduit into the disengager.

A more complete understanding of the present invention may be had by reference to the following description taken in connection with the accompanying drawings which form a part of the application in which.

Figure 1:
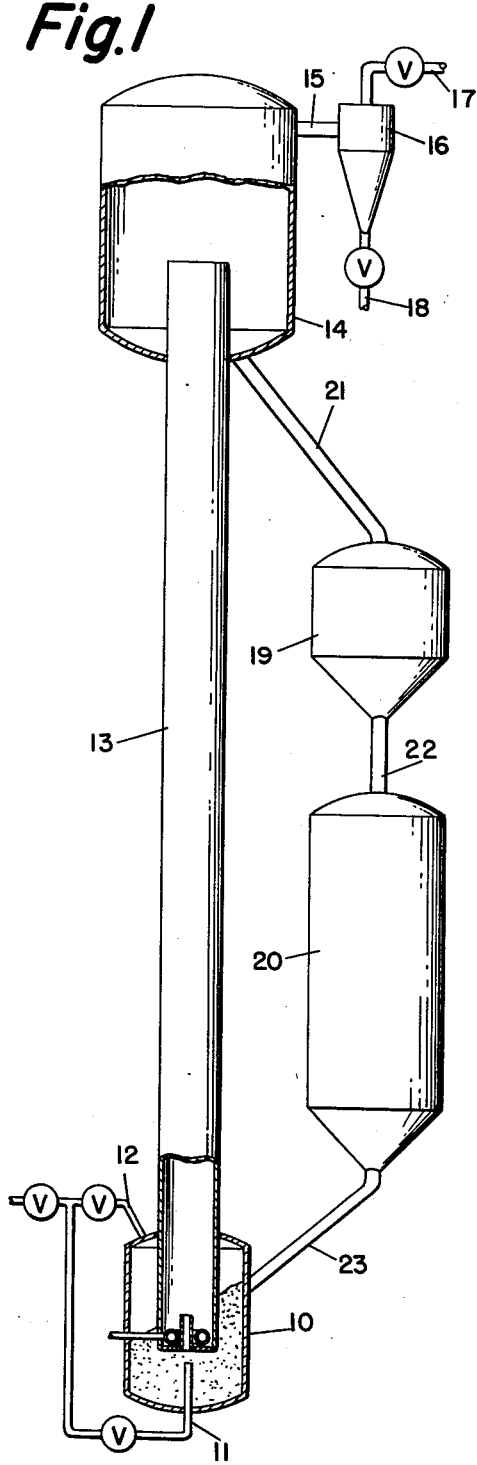
Figure 1 is an elevational view partly in section for schematically showing the improved arrangement as applied to the typical continuous catalytic cracking system.

Referring to Figure 1 of the drawing which clearly shows the structural elements of the system, a lower receptacle or chamber 10 functions as a catalyst engaging zone; that is, a zone wherein the catalyst is engaged by fluid supplied thereto by means of a conduit 11 extending upwardly into the chamber 10 and an upper conduit 12 for supplying the lifting fluid to the upper end of the engaging chamber for passage downwardly into the chamber. The lift conduit is indicated at 13 and comprises a vertical conduit having its lower end positioned within the chamber 10 and its upper end extending into an upper chamber 14 which is known as a disengaging chamber or zone wherein catalyst is disengaged from the fluid which is used to lift the catalyst upwardly into the disengaging zone. The lift fluid is discharged from the upper chamber 14 through a conduit 15 and is passed to any conventional separating means such as a cyclone separator 16 having an upper valved conduit 17 in communication therewith to remove separated fluid and lower valved conduit 18 for removing any particles which had become entrained in the lifting medium.

The catalyst which remains in the disengager 14 is returned by gravity to an upper reaction chamber 19 wherein usually a reaction is effected to obtain the desired product and continues to flow by gravity into a lower reaction chamber 20 wherein the catalyst or contact material is regenerated to remove therefrom any deposits which have been formed in the upper chamber 19. From the lower chamber 20 catalyst or contact material continues to flow by gravity and is returned to the engaging chamber 10. The conduits 21, 22 and 23 through which the catalyst or contact material flows in returning from the disengager 14 to the engager 10 are usually provided with means for supplying steam or other gaseous purging medium thereto in order to prevent reaction products formed in chamber 19 and regeneration fumes formed in chamber 20 from communicating with the other chambers in the unit.

Figure 2:
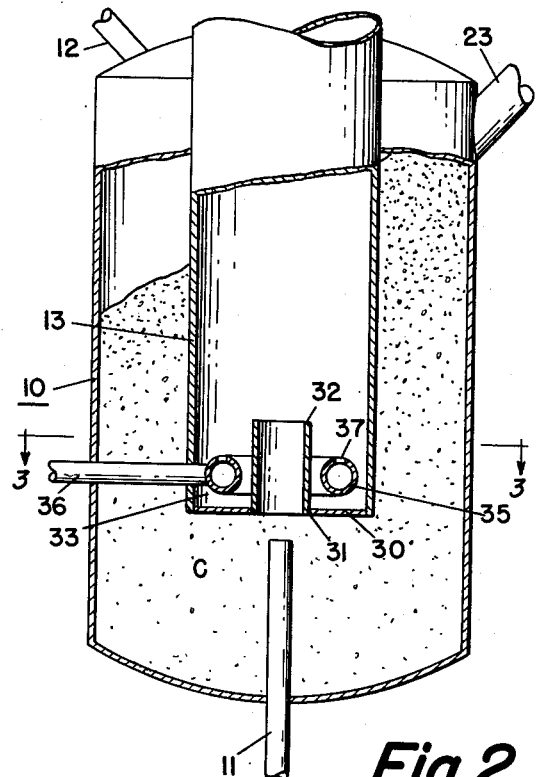
Figure 2 is an enlarged sectional elevation showing the invention as applied to the engager portion of the catalytic cracking system.
Figure 3:
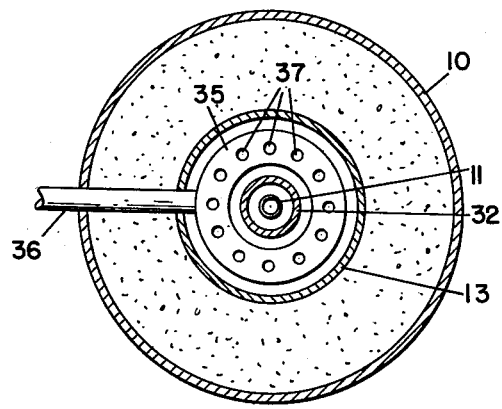
Figure 3 is a view taken along the line 3—3 of Figure 2.

Referring to Figures 2 and 3 a fluid medium is supplied through the conduit 11 which extends upwardly through the bottom of the engager 10 and has its upper open end positioned a short distance below the lower end of the lift conduit 13. The bottom of the lift conduit 13 is provided with plate 30 having a central aperture 31 therein. Within the central aperture is positioned a short upstanding tube or nozzle 32 forming with the lift conduit 13 an annular space 33. Within the annular space 33 a ring conduit 35 is positioned and is provided with a lifting fluid supply tube 36 having an open end exteriorly of the engager 10 for supplying the lifting medium thereto. The ring conduit is provided with an apertured area 37 which may take the form of apertures or a continuous annular opening.

In normal operation of a continuous cracking system catalyst will return by conduit 23 to the engager 10 continuously and will be lifted from the engager 10 upwardly into the disengager 14. In order to effect the lifting or moving of the catalyst upwardly fluid from conduit 11 will be directed from its upper open end into the body of catalyst or contact material disposed thereabove to lift the material upwardly into the tube 32 from which it will tend to pass into the annular space 33. Air from the supply pipe 36 will through the annular conduit 35 direct a fluid stream upwardly through the annular space 33 and then into the lift conduit 13. The velocity at the lower end of the lift conduit will be relatively low until the mixture of fluid and catalyst pellets or particles fill the lift conduit 13 after which the catalyst will be lifted at a gradual increase in velocity until it enters the disengager 14 where it will separate from the stream of lifting fluid due to the reduced velocity of the stream as it enters the relatively large area of the disengager 14.

The fluid stream acting upon the material to convey it into the tube 32 need be a stream of only sufficient velocity to carry the material through the tube, in which case it is spread laterally in all directions and tends to drop into the annular space 33. As it thus overflows the tube 32, it encounters an annular stream of liquid at high velocity, such stream alone being effective to raise the material through the lift conduit 13. The stream of fluid discharged from pipe 11 may, however, be a relatively higher velocity stream, in which case the material may leave tube 32 in an upward stream of gradually increasing diameter and be lifted through the lift conduit by the combined action of both fluid streams. However, care should be taken that the velocity of the fluid discharged from pipe 11 is not so high as to cause excessive attrition of solid material during its passage through nozzle 32.

It should be understood that the present invention is not directed to usual pneumatic conveying apparatus but is concerned with the continuous movement of catalyst or contact material from the engager 10 to the disengager 14 in such a manner that the catalyst or contact material is raised to the disengager 14 with the smallest degree of frictional contact of the catalyst or contact material with itself or with the lifting apparatus.

I claim:

1. Apparatus for elevating granular material from a lower chamber containing a body of the material to an upper chamber which comprises an upright elevating conduit having its lower end extending through the top of said lower chamber to be positioned therein and its upper end extending into the upper chamber, a plate having a central aperture therein secured to the lower end of the elevating conduit, a nozzle having its lower end secured in said aperture and its upper end extending a short distance into the elevating conduit providing a space therewith, a fluid conduit extending through the bottom of the lower chamber and having its outlet end positioned below the lower end of the elevating conduit and within the body of granular material to lift the material upwardly and through said nozzle, means for supplying a fluid at high velocity to said space to convey the material passing through the nozzle upwardly into and through the elevating conduit to the upper chamber.

2. Apparatus for elevating granular material from a lower chamber containing a body of the material to an upper chamber which comprises an upright elevating conduit having its lower end extending through the top of said lower chamber to be positioned therein and its upper end extending into the upper chamber, an annular plate having a central aperture therein secured to the lower end of the elevating conduit, a nozzle having its lower end secured in said aperture and its upper end extending a short distance into the elevating conduit providing an annular space therewith, a fluid conduit extending through the bottom of the lower chamber and having its outlet end positioned below the lower end of the elevating conduit and within the body of granular material to lift the material upwardly and through said nozzle, means for supplying a fluid at high velocity to said annular space to convey the material passing through the nozzle upwardly into and through the elevating conduit to the upper chamber.

3. Apparatus for elevating granular material from a lower chamber containing a body of the material to an upper chamber which comprises an upright elevating conduit having its lower end extending through the top of said lower chamber to be positioned within the body of material and its upper end extending into the upper chamber, an annular plate having a central aperture therein secured to the lower end of the elevating conduit, a nozzle having its lower end secured in said aperture and its upper end extending a short distance into the elevating conduit providing an annular space therewith, a fluid conduit extending through the bottom of the lower chamber and having its outlet end positioned below the lower end of the elevating conduit and within the body of granular material to lift the material upwardly into and through said nozzle, a ring conduit positioned within said annular space, an apertured area therein, means for supplying a fluid at high velocity to the ring conduit for passage upwardly through the annular space to convey the material passing through the nozzle upwardly into and through the elevating conduit to the upper chamber.

4. Apparatus for elevating granular material from a lower chamber containing a body of the material to an upper chamber which comprises an upright elevating conduit having its lower end extending through the top of said lower chamber to be positioned therein and its upper end extending into the upper chamber, a plate having a central aperture therein secured to the lower end of the elevating conduit, a nozzle having its lower end secured in said aperture and its upper end extending a short distance into the elevating conduit providing a space therewith, a fluid conduit extending through a wall of the lower chamber and having its outlet end positioned below the lower end of the elevating conduit and within the body of granular material to lift the material upwardly and through said nozzle, means for supplying a fluid at high velocity to said space to convey the material passing through the nozzle upwardly into and through the elevating conduit to the upper chamber.

5. Apparatus for elevating granular material from a lower chamber containing a body of the material to an upper chamber which comprises an upright elevating conduit having its lower end extending through the top of said lower chamber to be positioned therein and its upper end extending into the upper chamber, a plate having a central aperture therein secured to the lower end of the elevating conduit, a nozzle having its lower end secured in said aperture and its upper end extending a short distance into the elevating conduit providing a space therewith, a fluid conduit extending through a wall of the lower chamber and having its outlet end positioned below the lower end of the elevating conduit and within the body of granular material to lift the material through and beyond said nozzle upwardly and laterally within the elevating conduit, means for supplying a fluid at a high velocity to said space and to therein direct it upwardly into the elevating conduit to provide a lifting force to the material that has been supplied as specified to the conduit through said nozzle.

EDWARD J. GRACE, Jr.

REFERENCES CITED

The following references are of record in the file of this patent:

UNITED STATES PATENTS

| Number | Name | Date |
| --- | --- | --- |
| 2,123,537 | Marr | July 12, 1938 |
| 2,487,961 | Angell | Nov. 15, 1949 |

FOREIGN PATENTS

| Number | Country | Date |
| --- | --- | --- |
| 180,397 | Great Britain | May 11, 1922 |